US011971345B2

(12) United States Patent
Uchida et al.

(10) Patent No.: US 11,971,345 B2
(45) Date of Patent: Apr. 30, 2024

(54) SMOKE DETECTOR

(71) Applicant: NOHMI BOSAI LTD., Tokyo (JP)

(72) Inventors: Masamichi Uchida, Tokyo (JP); Takahiro Noguchi, Tokyo (JP); Taizo Matsuda, Tokyo (JP); Tomohiro Kato, Tokyo (JP); Kenji Mizutani, Tokyo (JP); Takahiro Kaneko, Tokyo (JP); Takahiro Watanabe, Tokyo (JP)

(73) Assignee: NOHMI BOSAI LTD., Tokyo (JP)

( * ) Notice: Subject to any disclaimer, the term of this patent is extended or adjusted under 35 U.S.C. 154(b) by 399 days.

(21) Appl. No.: 17/428,671

(22) PCT Filed: Mar. 10, 2020

(86) PCT No.: PCT/JP2020/010285
§ 371 (c)(1),
(2) Date: Aug. 5, 2021

(87) PCT Pub. No.: WO2020/184557
PCT Pub. Date: Sep. 17, 2020

(65) Prior Publication Data
US 2022/0120672 A1    Apr. 21, 2022

(30) Foreign Application Priority Data
Mar. 11, 2019  (JP) ................. 2019-043747

(51) Int. Cl.
*G01N 21/25*  (2006.01)
*G01N 21/31*  (2006.01)
*G08B 17/107*  (2006.01)
*G01N 21/01*  (2006.01)

(52) U.S. Cl.
CPC .......... *G01N 21/256* (2013.01); *G01N 21/31* (2013.01); *G08B 17/107* (2013.01); *G01N 2021/0181* (2013.01); *G01N 2201/0227* (2013.01)

(58) Field of Classification Search
CPC ...... G01N 21/256; G01N 21/31; G01N 21/53; G01N 21/00; G01N 2021/0181;
(Continued)

(56) References Cited

U.S. PATENT DOCUMENTS

2001/0020899 A1    9/2001  Kadwell et al.
2004/0066512 A1    4/2004  Politze et al.
(Continued)

FOREIGN PATENT DOCUMENTS

DE   202015000820 U1 *  3/2015
JP   H07296276 A       11/1995
JP   4010455 B2        11/2007

OTHER PUBLICATIONS

Office Action (Notice of Reasons for Refusal) dated Mar. 7, 2023, in corresponding Japanese Patent Application No. 2019-043747 and English translation of the Office Action. (5 pages).
(Continued)

*Primary Examiner* — Hoa Q Pham
(74) *Attorney, Agent, or Firm* — BUCHANAN INGERSOLL & ROONEY PC

(57) ABSTRACT

A smoke detector includes: a casing; a first light emitting unit; a second light emitting unit; and a light receiving unit. A second scattering angle that is an angle between the reception axis of the light receiving unit and a second extension extending from an intersection of the second emission axis and the reception axis in a direction away from the second light emitting unit is larger than a first scattering angle that is an angle between the reception axis of the light receiving unit and a first extension extending from an intersection of the first emission axis and the reception axis in a direction away from the first light emitting unit.

3 Claims, 4 Drawing Sheets

(58) Field of Classification Search
CPC .... G08B 17/107; G08B 17/10; G08B 17/103; G08B 29/04
USPC ......... 356/335–343, 432–440; 340/328, 628, 340/630, 632, 506, 587, 304, 693.6; 250/573–575
See application file for complete search history.

(56) References Cited

U.S. PATENT DOCUMENTS

| | | | | |
|---|---|---|---|---|
| 2011/0194111 | A1* | 8/2011 | Dohi | G08B 17/107 356/343 |
| 2013/0135607 | A1* | 5/2013 | Wedler | G01N 21/53 356/342 |
| 2022/0319290 | A1* | 10/2022 | Watanabe | G08B 17/113 |

OTHER PUBLICATIONS

International Search Report (PCT/ISA/210) with translation and Written Opinion (PCT/ISA/237) dated May 26, 2020, by the Japanese Patent Office as the International Searching Authority for International Application No. PCT/JP2020/010285.

Office Action (Notice of Reasons for Refusal) dated Sep. 20, 2022, in corresponding Japanese Patent Application No. 2019-043747 and English translation of the Office Action. (5 pages).

Office Action dated Jun. 2, 2022, in corresponding Chinese Patent Application No. 202080020155.5 and English translation of the Office Action. (8 pages).

* cited by examiner

SECTIONAL VIEW TAKEN ALONG LINE A-A

SECTIONAL VIEW TAKEN ALONG LINE B-B

SMOKE DETECTOR

TECHNICAL FIELD

The present disclosure relates to a smoke detector that detects smoke from, for example, a fire.

BACKGROUND ART

Known smoke detectors to detect smoke from, for example, a fire, include a photoelectric smoke detector configured such that when smoke enters a smoke detection chamber, light emitted from a light emitting unit is scattered by the smoke, the scattered light reaches a light receiving unit, and the smoke is thus detected. Furthermore, a developed smoke detector includes two light emitting units arranged in a smoke detection chamber and identifies the type of smoke on the basis of the amounts of light beams emitted from the respective light emitting units.

Patent Literature 1 discloses a scattered-light smoke detector including a first light emitting element that emits light having a first wavelength, a second light emitting element that emits light having a second wavelength different from the first wavelength, and a light receiving element positioned so as not to directly receive light beams from the first and second light emitting elements. The smoke detector disclosed in Patent Literature 1 is configured such that a second scattering angle formed by intersection of the optical axes of the second light emitting element and the light receiving element is larger than a first scattering angle formed by intersection of the optical axes of the first light emitting element and the light receiving element. As described in Patent Literature 1, the second wavelength of the second light emitting element is shorter than the first wavelength of the first light emitting element. In Patent Literature 1, the amount of light emitted from the first light emitting element and scattered by smoke is compared with the amount of light emitted from the second light emitting element and scattered by the smoke, and the ratio between the amounts of light scattered is compared with a threshold value, thus identifying the type of smoke. Patent Literature 1 describes, as an example, a case where smoke from smoldering cotton wick and smoke from burning kerosene are used to identify the type of detected smoke.

CITATION LIST

Patent Literature

Patent Literature 1: Japanese Patent No. 4010455 (FIG. 2, for example)

SUMMARY OF INVENTION

Technical Problem

However, the scattered-light smoke detector disclosed in Patent Literature 1 does not have a sufficient capacity for discriminating between smokes.

The present disclosure has been made to solve the above-described problem and aims to provide a smoke detector having a high capacity for discriminating between smokes.

Solution to Problem

A smoke detector according to an embodiment of the present disclosure includes a casing having therein a smoke detection chamber to detect smoke; a first light emitting unit disposed in the casing, the first light emitting unit being configured to emit light having a first wavelength to the smoke detection chamber, the first light emitting unit having a first emission axis; a second light emitting unit disposed in the casing, the second light emitting unit being configured to emit light having a second wavelength to the smoke detection chamber, the second wavelength being longer than the first wavelength of the first light emitting unit, the second light emitting unit having a second emission axis; and a light receiving unit disposed in the casing, the light receiving unit being configured to receive the light emitted from the first light emitting unit and the light emitted from the second light emitting unit, the light receiving unit having a reception axis. A second scattering angle that is an angle between the reception axis of the light receiving unit and a second extension extending from an intersection of the second emission axis and the reception axis in a direction away from the second light emitting unit is larger than a first scattering angle that is an angle between the reception axis of the light receiving unit and a first extension extending from an intersection of the first emission axis and the reception axis in a direction away from the first light emitting unit.

Advantageous Effects of Invention

According to the embodiment of the present disclosure, the second scattering angle, which is the angle between the reception axis of the light receiving unit and the second extension extending from the intersection of the second emission axis and the reception axis in the direction away from the second light emitting unit, is larger than the first scattering angle, which is the angle between the reception axis of the light receiving unit and the first extension extending from the intersection of the first emission axis and the reception axis in the direction away from the first light emitting unit. This makes it easier for the ratio between a scattered light intensity of light from the first light emitting unit and that from the second light emitting unit to vary depending on the type of smoke. Thus, the smoke detector has a high capacity for discriminating between smokes.

DESCRIPTION OF EMBODIMENT

An embodiment of a smoke detector according to the present disclosure will be described below with reference to the drawings. The embodiment, which will be described below, is not intended to limit the present disclosure. Note that the relationship between the sizes of components in the following figures including FIG. 1 may differ from that between the actual sizes of the components. In the following description, for the sake of clarity, terms representing directions will be used as appropriate. These terms are used herein only for the purpose of convenience of description and are not intended to limit the present disclosure. Examples of the terms representing directions include "upward", "downward", "rightward", "leftward", "forward", and "backward".

Embodiment 1

Figure 1:
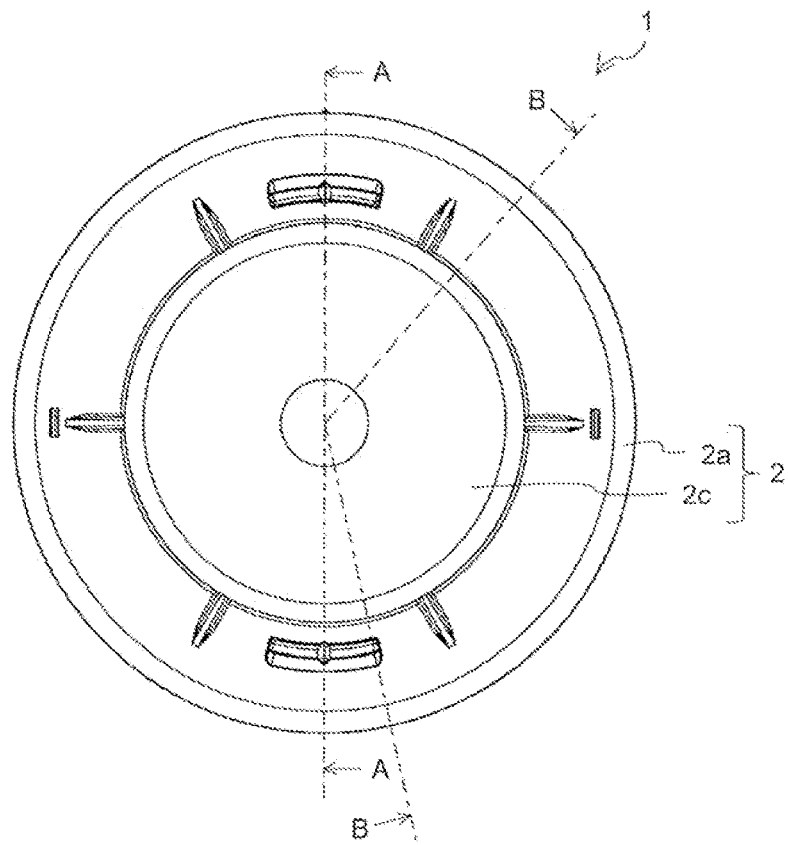
FIG. 1 is a front view of a smoke detector 1 according to Embodiment 1 of the present disclosure.
Figure 2:
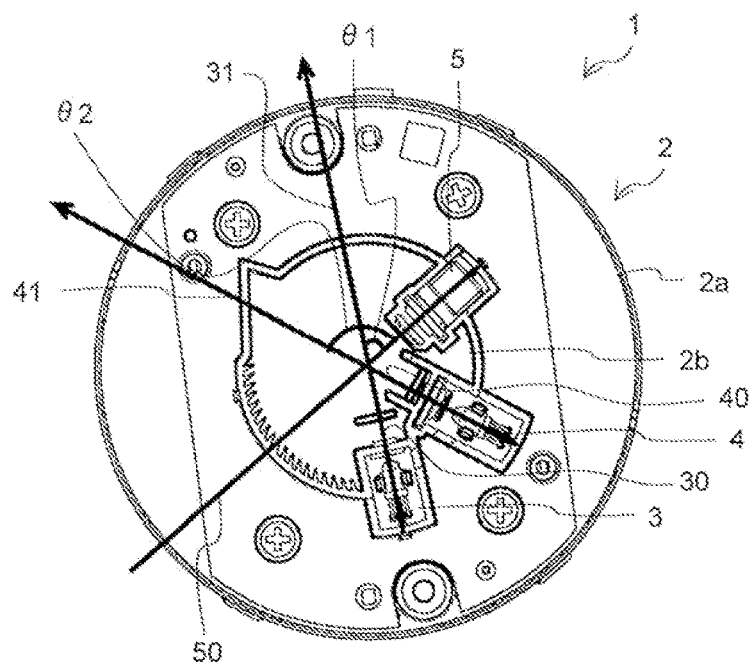
FIG. 2 is a cross-sectional view of the smoke detector 1 according to Embodiment 1 of the present disclosure.
Figure 3:
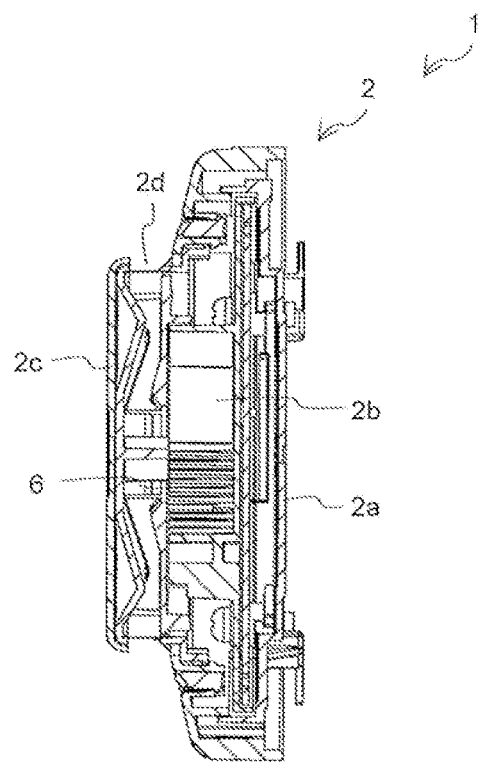
FIG. 3 is a sectional view of the smoke detector 1 according to Embodiment 1 of the present disclosure taken in a radial direction thereof.
Figure 4:
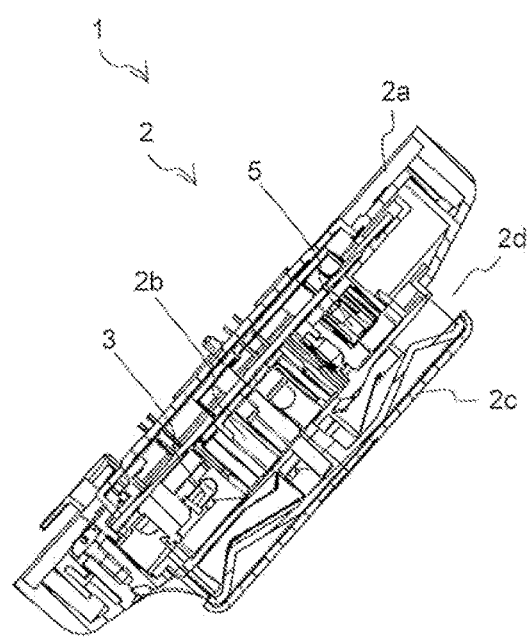
FIG. 4 is a sectional view of the smoke detector 1 according to Embodiment 1 of the present disclosure taken in the radial direction.

FIG. 1 is a front view of a smoke detector 1 according to Embodiment 1 of the present disclosure. FIG. 2 is a cross-sectional view of the smoke detector 1 according to Embodiment 1 of the present disclosure. FIG. 3 is a sectional view of the smoke detector 1 according to Embodiment 1 of the present disclosure taken in a radial direction thereof and illustrates a section taken along line A-A in FIG. 1. FIG. 4 is a sectional view of the smoke detector 1 according to Embodiment 1 of the present disclosure taken in the radial direction and illustrates a section taken along line B-B in FIG. 1. As illustrated in FIGS. 1 to 4, the smoke detector 1 includes a casing 2, a first light emitting unit 3, a second light emitting unit 4, a light receiving unit 5, a notification unit (not illustrated), an amplification unit 10 (refer to FIG. 5), a storage unit 11 (refer to FIG. 5), and a control unit 12 (refer to FIG. 5).

(Casing 2)

The casing 2, which appears, for example, substantially cylindrical, includes a mount 2a to be attached to a mounting surface, such as a ceiling, and an inlet portion 2c protruding from the mount 2a in a direction away from the mounting surface. The mount 2a is attached to the mounting surface, such as a ceiling, and has a smoke detection chamber 2b therein. The smoke detection chamber 2b contains the first light emitting unit 3, the second light emitting unit 4, the light receiving unit 5, and a labyrinth 6. The labyrinth 6 has a function of preventing light emitted from the first light emitting unit 3 and light emitted from the second light emitting unit 4 from directly impinging on the light receiving unit 5 and a function of scattering the light emitted from the first light emitting unit 3 and the light emitted from the second light emitting unit 4 in the smoke detection chamber 2b.

The inlet portion 2c, which is a part protruding downwardly from the mount 2a, has an opening 2d as a portion of its side. The inlet portion 2c guides smoke entering through the opening 2d to the smoke detection chamber 2b of the mount 2a located above the inlet portion 2c.

(First Light Emitting Unit 3)

The first light emitting unit 3, which is disposed in the smoke detection chamber 2b of the casing 2, emits light having a first wavelength $\lambda 1$ to the smoke detection chamber 2b and has a first emission axis 30. The first light emitting unit 3 includes a light emitting diode (LED). The first wavelength $\lambda 1$ of the first light emitting unit 3 is, for example, in the blue region of visible light. As used herein, blue light refers to light having a wavelength of from approximately 440 nm to approximately 480 nm, for example.

(Second Light Emitting Unit 4)

The second light emitting unit 4, which is disposed in the smoke detection chamber 2b of the casing 2, emits light having a second wavelength $\lambda 2$ to the smoke detection chamber 2b and has a second emission axis 40. The second light emitting unit 4 includes an LED. The second wavelength $\lambda 2$ of the second light emitting unit 4 is longer than the first wavelength $\lambda 1$ and is, for example, in the red region of visible light. As used herein, red light refers to light having a wavelength of from approximately 610 nm to approximately 750 nm, for example.

(Light Receiving Unit 5)

The light receiving unit 5, which is disposed in the smoke detection chamber 2b of the casing 2, receives light emitted from the first light emitting unit 3 and light emitted from the second light emitting unit 4 and has a reception axis 50. The light receiving unit 5 includes a photodiode.

(Scattering Angle)

As used herein, a scattering angle refers to an angle between the reception axis 50 of the light receiving unit 5 and an extension extending from the intersection of the reception axis 50 and the emission axis of a light emitting unit in a direction away from the light emitting unit. A scattering angle less than 90 degrees indicates that the light receiving unit 5 is located forward in the direction of travel of light emitted from the light emitting unit. Such a scattering angle is called a forward scattering angle. A scattering angle greater than 90 degrees indicates that the light receiving unit 5 is located backward in the direction of travel of light emitted from the light emitting unit. Such a scattering angle is called a backward scattering angle. Referring to FIG. 2, a second scattering angle $\theta 2$, which is an angle between the reception axis 50 of the light receiving unit 5 and a second extension 41 extending from the intersection of the second emission axis 40 and the reception axis 50 in a direction away from the second light emitting unit 4, is larger than a first scattering angle $\theta 1$, which is an angle between the reception axis 50 of the light receiving unit 5 and a first extension 31 extending from the intersection of the first emission axis 30 and the reception axis 50 in a direction away from the first light emitting unit 3.

(Notification Unit)

The notification unit is configured to provide notification of detection of smoke when the smoke detector 1 detects smoke. The notification unit includes a buzzer and an LED. If the smoke detector 1 is connected to a fire receiver and is configured to transmit a signal representing detection of smoke to the fire receiver, a notification unit included in the fire receiver may provide notification of detection of smoke.

(Amplification Unit 10)

Figure 5:
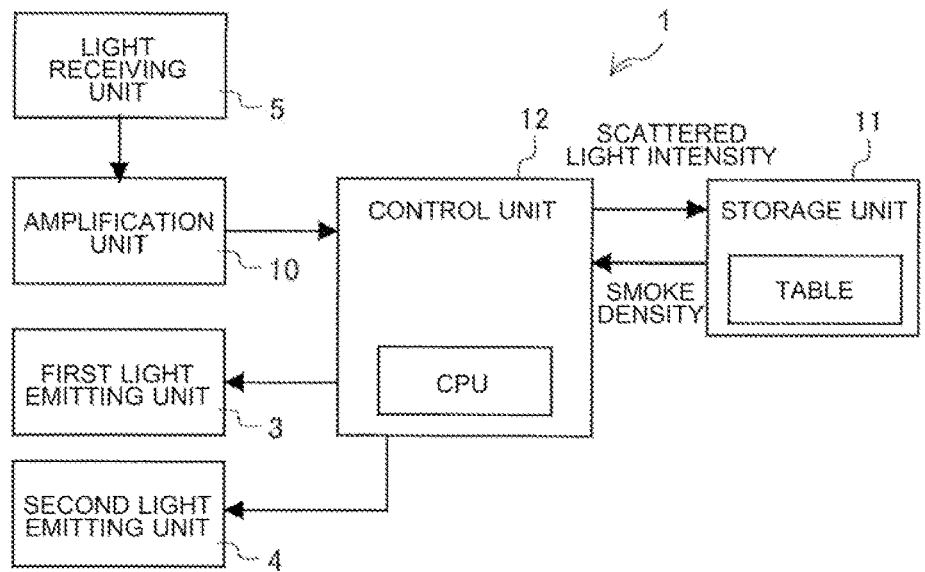
FIG. 5 is a block diagram of a hardware configuration of the smoke detector 1 according to Embodiment 1 of the present disclosure.

FIG. 5 is a block diagram of a hardware configuration of the smoke detector 1 according to Embodiment 1 of the present disclosure. As illustrated in FIG. 5, the amplification unit 10 amplifies a current from the light receiving unit 5 receiving light and outputs the amplified current to the control unit 12.

(Storage Unit 11)

The storage unit 11 includes a memory and stores threshold values and a table, which are used by the control unit 12. Embodiment 1 illustrates three types of smoke to be discriminated. Examples of the types of smoke include white smoke, grey smoke, and black smoke. The storage unit 11 stores a white smoke threshold value and a black smoke threshold value based on a grey-smoke-induced scattered light intensity, serving as a reference. The white smoke threshold value is set between the grey-smoke-induced scattered light intensity and a white-smoke-induced scattered light intensity. The black smoke threshold value is set between the grey-smoke-induced scattered light intensity and a black-smoke-induced scattered light intensity. The smoke detector 1 discriminates between three types of smoke, or white smoke, grey smoke, and black smoke, by using the white smoke threshold value and the black smoke threshold value set based on the grey-smoke-induced scattered light intensity as described above. Either one of the white smoke threshold value and the black smoke threshold value may be greater or less than the other.

Figure 6:
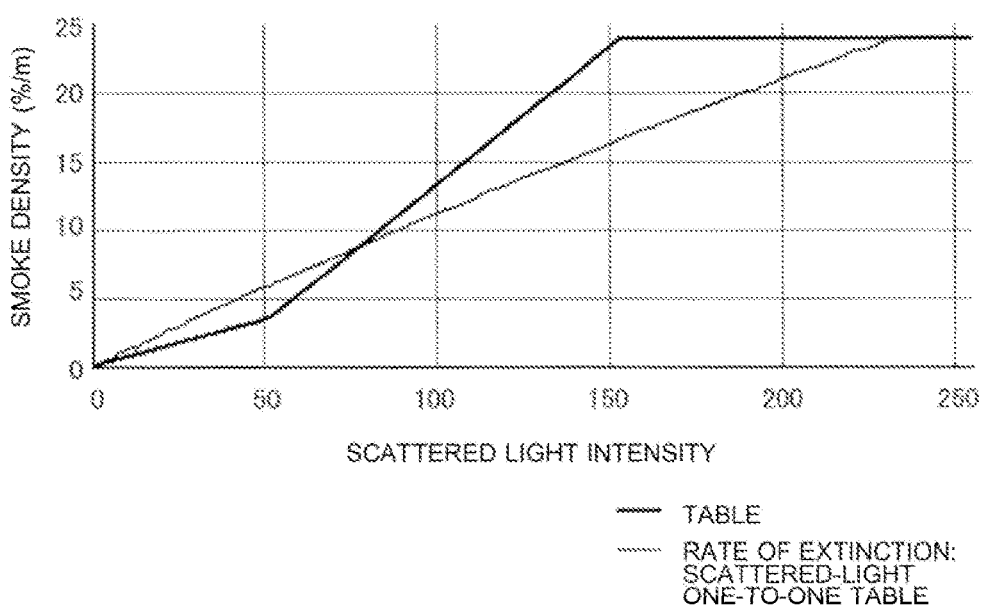
FIG. 6 includes a graph representing a table stored in a storage unit 11 of the smoke detector 1 according to Embodiment 1 of the present disclosure.

FIG. 6 includes a graph representing a table stored in the storage unit 11 of the smoke detector 1 according to Embodiment 1 of the present disclosure. As illustrated in FIG. 6, the table describes the relationship between scattered light intensities and smoke densities (%/m) corresponding to the scattered light intensities. In FIG. 6, the horizontal axis represents the scattered light intensity, and the vertical axis represents the smoke density. In the table, a received scattered light intensity below an intensity threshold value corresponds to a smoke density lower than a smoke density represented by a proportionality line representing that the scattered light intensity is directly proportional to the smoke density, whereas a scattered light intensity at or above the intensity threshold value corresponds to a smoke density higher than a smoke density represented by the proportionality line. Herein, the proportionality line represents the rate of extinction and represents a one-to-one correspondence between scattered light intensities and smoke densities. The intensity threshold value can be changed as appropriate. In Embodiment 1, the intensity threshold value is set to approximately 75.

If a low scattered light intensity, which is not stable and varies greatly, is converted into a smoke density based on the one-to-one correspondence relationship, false detection of smoke may occur. For this reason, a low scattered light intensity is converted into a smoke density lower than its proper smoke density. In contrast, if a high scattered light intensity, which indicates a high probability of the presence of smoke, is converted into a smoke density based on the one-to-one correspondence relationship, there is a little likelihood that smoke may fail to be detected. For this reason, a high scattered light intensity is converted into a smoke density higher than its proper smoke density, thus ensuring detection of smoke. In Embodiment 1, as described above, a scattered light intensity below the intensity threshold value is converted into a smoke density lower than a smoke density represented by the proportionality line, thus reducing false detection of smoke. In Embodiment 1, a scattered light intensity at or above the intensity threshold value is converted into a smoke density higher than a smoke density represented by the proportionality line, thus ensuring detection of smoke.

(Control Unit 12)

The control unit 12 receives the intensity of scattered light received by the light receiving unit 5 and includes a central processing unit (CPU). The control unit 12 calculates the ratio between a scattered light intensity of light emitted from the first light emitting unit 3 and that from the second light emitting unit 4 and compares the ratio with a threshold value. The control unit 12 identifies the type of smoke by determining whether the ratio is higher than the threshold value. In Embodiment 1, the smoke detector 1 compliant with standards established by Underwriters Laboratories Inc. (UL) will be described.

The control unit 12 determines the presence of while smoke when the intensity of scattered light received by the light receiving unit 5 exceeds the white smoke threshold value stored in the storage unit 11, and determines the presence of black smoke when the intensity of scattered light received by the light receiving unit 5 exceeds the black smoke threshold value stored in the storage unit 11. Specifically, when the ratio between a scattered light intensity of light emitted from the first light emitting unit 3 and that from the second light emitting unit 4 exceeds the white smoke threshold value, the control unit 12 determines that white smoke is present. When the ratio between the scattered light intensity of light emitted from the first light emitting unit 3 and that from the second light emitting unit 4 exceeds the black smoke threshold value, the control unit 12 determines that black smoke is present. When the ratio between the scattered light intensity of light emitted from the first light emitting unit 3 and that from the second light emitting unit 4 does not exceed both the white smoke threshold value and the black smoke threshold value, the control unit 12 determines that grey smoke is present. For white smoke and grey smoke, the control unit 12 determines the presence or absence of a fire without amplifying the scattered light intensities. For black smoke, the control unit 12 amplifies the scattered light intensities and determines the presence or absence of a fire.

Furthermore, the control unit 12 receives a signal representing a scattered light intensity of light received by the light receiving unit 5 and converts the received scattered light intensity into a smoke density on the basis of the table representing the relationship between the scattered light intensities and the smoke densities corresponding to the scattered light intensities. The scattered light intensity may be either a scattered light intensity of light emitted from the first light emitting unit 3 or a scattered light intensity of light emitted from the second light emitting unit 4.

Figure 7:
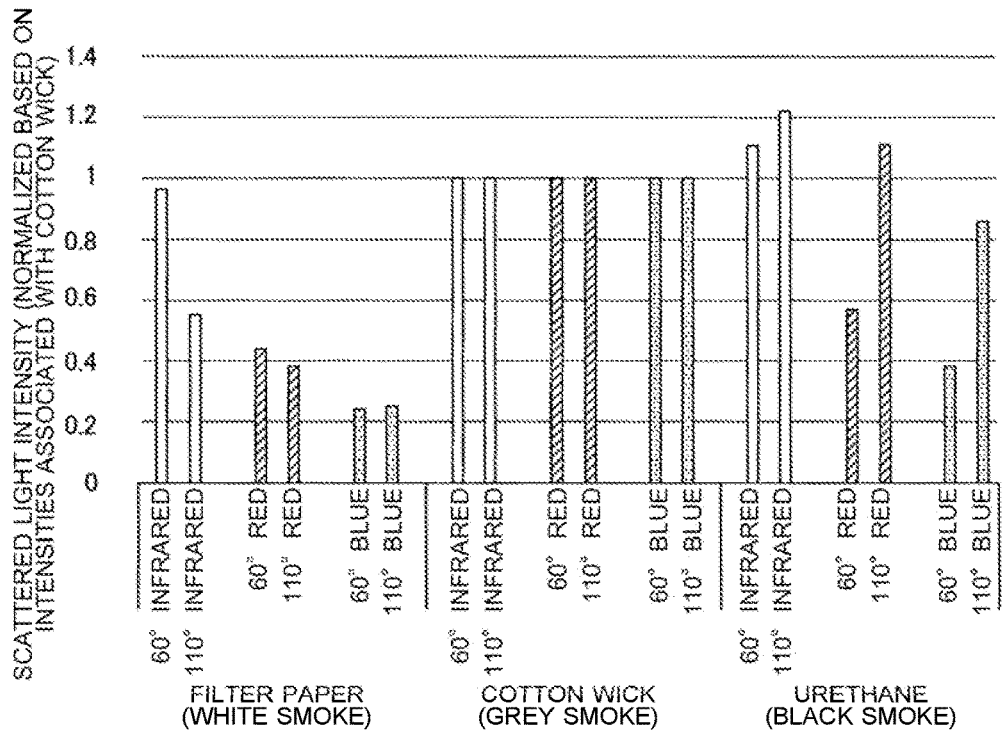
FIG. 7 is a bar chart representing scattered light intensities in the smoke detector 1 according to Embodiment 1 of the present disclosure.

FIG. 7 is a bar chart representing scattered light intensities in the smoke detector 1 according to Embodiment 1 of the present disclosure. Scattered light intensities obtained with wavelengths of the light emitting units and scattering angles changed as appropriate will now be described. As used herein, white smoke refers to smoke from burning filter paper, grey smoke refers to smoke from burning cotton wick, and black smoke refers to smoke from burning urethane. For the wavelengths of the light emitting units, a wavelength in the infrared region (hereinafter, referred to as infrared light), a wavelength in the red region of visible light (hereinafter, referred to as red light), and a wavelength in the blue region of visible light (hereinafter, referred to as blue light) are used. For the scattering angles of the light emitting units, 60 degrees and 110 degrees are used. Of these angles, a scattering angle of 60 degrees is a forward scattering angle, and a scattering angle of 110 degrees is a backward scattering angle. In FIG. 7, the intensities of light scattered by grey smoke from cotton wick are represented as a reference value=1.

The intensities of light scattered by white smoke from filter paper will now be described. FIG. 7 illustrates "filter paper (white smoke): approximately 0.97" under conditions where "infrared light, 60 degrees", "filter paper (white smoke): approximately 0.56" under conditions where "infrared light, 110 degrees", "filter paper (white smoke): approximately 0.44" under conditions where "red light, 60 degrees", "filter paper (white smoke): approximately 0.38" under conditions where "red light, 110 degrees", "filter paper (white smoke): approximately 0.24" under conditions where "blue light, 60 degrees", and "filter paper (white smoke): approximately 0.25" under conditions where "blue light, 110 degrees".

The intensities of light scattered by black smoke from urethane will now be described. FIG. 7 illustrates "urethane (black smoke): approximately 1.11" under conditions where "infrared light, 60 degrees", "urethane (black smoke): approximately 1.22" under conditions where "infrared light, 110 degrees", "urethane (black smoke): approximately 0.57" under conditions where "red light, 60 degrees", "urethane (black smoke): approximately 1.11" under conditions where "red light, 110 degrees", "urethane (black smoke): approximately 0.38" under conditions where "blue light, 60 degrees", and "urethane (black smoke): approximately 0.86" under conditions where "blue light, 110 degrees".

The ratios between scattered light intensities obtained with appropriately selected combinations of the first light emitting unit 3 and the second light emitting unit 4 are described in Table 1. Table 1 describes, as the combinations of the first light emitting unit 3 and the second light emitting unit 4, Sample 1 with "first: blue light, 60 degrees" and "second: infrared light, 110 degrees", Sample 2 with "first: blue light, 60 degrees" and "second: red light, 110 degrees", Sample 3 with "first: red light, 60 degrees" and "second: red light, 110 degrees", and Sample 4 with "first: infrared light, 60 degrees" and "second: blue light, 110 degrees".

TABLE 1

| Sample | First light emitting unit | Second light emitting unit | Ratio associated with filter paper (white smoke) | Ratio associated with cotton wick (grey smoke) | Ratio associated with urethane (black smoke) |
| --- | --- | --- | --- | --- | --- |
| 1 | 60 blue | 110 infrared | 2.32 | 1 | 3.19 |
| 2 | 60 blue | 110 red | 1.59 | 1 | 2.91 |
| 3 | 60 red | 110 red | 0.86 | 1 | 1.96 |
| 4 | 60 infrared | 110 blue | 0.26 | 1 | 0.77 |

Referring to Table 1, the ratio between the scattered light intensity of light emitted from the first light emitting unit 3 and the scattered light intensity of light emitted from the second light emitting unit 4 associated with filter paper (white smoke) in Sample 1 is 2.32, that in Sample 2 is 1.59, that in Sample 3 is 0.86, and that in Sample 4 is 0.26. Furthermore, the ratio between the scattered light intensity of light emitted from the first light emitting unit 3 and the scattered light intensity of light emitted from the second light emitting unit 4 associated with urethane (black smoke) in Sample 1 is 3.19, that in Sample 2 is 2.91, that in Sample 3 is 1.96, and that in Sample 4 is 0.77.

Figure 8:
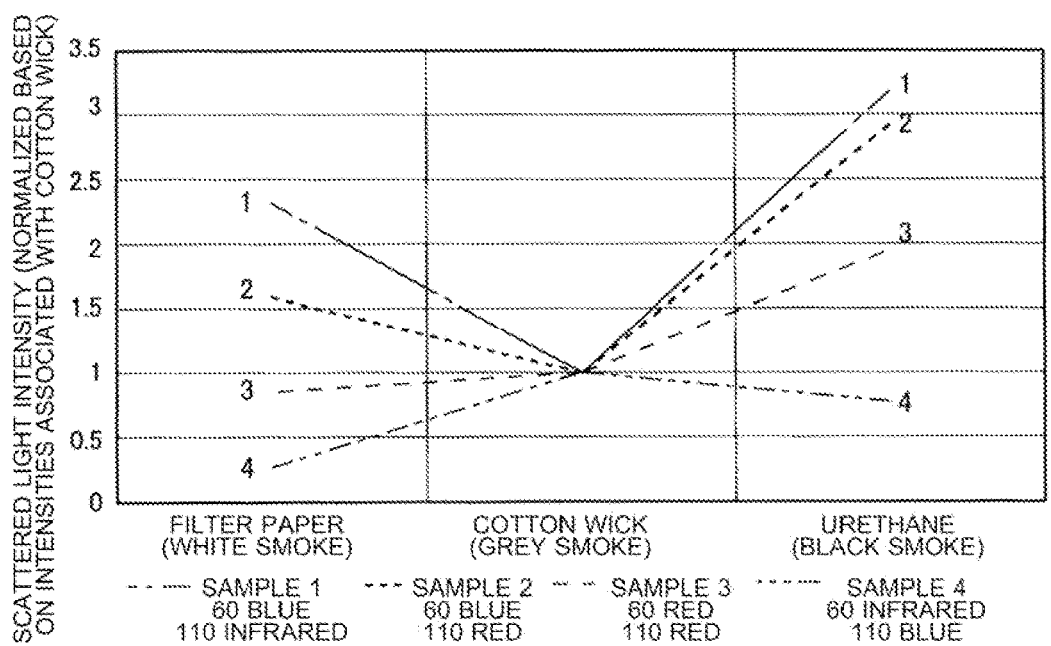
FIG. 8 includes line graphs representing the scattered light intensities in the smoke detector 1 according to Embodiment 1 of the present disclosure.

FIG. 8 includes line graphs representing the scattered light intensities in the smoke detector 1 according to Embodiment 1 of the present disclosure and illustrates the plotted ratios associated with filter paper (white smoke), cotton wick (grey smoke), and urethane (black smoke) in Table 1. The larger the difference between the ratio associated with cotton wick (grey smoke) and the ratio associated with urethane (black smoke), the easier it is to discriminate between grey smoke and black smoke. Furthermore, the larger the difference between the ratio associated with filter paper (white smoke) and the ratio associated with cotton wick (grey smoke), the easier it is to discriminate between white smoke and grey smoke. Additionally, the larger the difference between the ratio associated with filter paper (white smoke) and the ratio associated with urethane (black smoke), the easier it is to discriminate between white smoke and black smoke.

Referring to FIG. 8, for Sample 3 and Sample 4, both the difference between the ratio associated with cotton wick (grey smoke) and the ratio associated with urethane (black smoke) and the difference between the ratio associated with filter paper (white smoke) and the ratio associated with cotton wick (grey smoke) are small. In contrast, for Sample 1 and Sample 2, both the difference between the ratio associated with cotton wick (grey smoke) and the ratio associated with urethane (black smoke) and the difference between the ratio associated with filter paper (white smoke) and the ratio associated with cotton wick (grey smoke) are large. Therefore, Sample 1 with "first: blue light, 60 degrees" and "second: infrared light, 110 degrees" and Sample 2 with "first: blue light, 60 degrees" and "second: red light, 110 degrees" are preferable combinations of the first light emitting unit 3 and the second light emitting unit 4. Furthermore, in comparison between Sample 1 and Sample 2, the difference between the ratio associated with filter paper (white smoke) and the ratio associated with urethane (black smoke) in Sample 2 is larger than that in Sample 1. In Embodiment 1, discrimination between white smoke, grey smoke, and black smoke can be achieved by using Sample 2 with "first: blue light, 60 degrees" and "second: red light, 110 degrees".

In FIG. 8, the difference between the ratio associated with cotton wick (grey smoke) and the ratio associated with urethane (black smoke) in each of Samples 1, 2, and 3 is larger than that in Sample 4. Samples 1, 2, and 3 use infrared light or red light and a scattering angle of 110 degrees, whereas Sample 4 uses blue light and a scattering angle of 110 degrees. For Sample 3, both the first light emitting unit 3 and the second light emitting unit 4 emit red light. For this reason, Sample 3 is excluded. Therefore, as long as the second wavelength λ2 of the second light emitting unit 4 is longer than the first wavelength λ1 of the first light emitting unit 3 and the second scattering angle θ2 is larger than the first scattering angle θ1, at least grey smoke and black smoke can be discriminated from each other.

As described above, the white smoke threshold value is set between the grey-smoke-induced scattered light intensity and the white-smoke-induced scattered light intensity. Specifically, the white smoke threshold value is set between the ratio between the grey-smoke-induced scattered light intensities and the ratio between the white-smoke-induced scattered light intensities. In addition, the black smoke threshold value is set between the grey-smoke-induced scattered light intensity and the black-smoke-induced scattered light intensity. Specifically, the black smoke threshold value is set between the ratio between the grey-smoke-induced scattered light intensities and the ratio between the black-smoke-induced scattered light intensities. The control unit 12 determines the presence of white smoke when the ratio between the scattered light intensity of light from the first light emitting unit 3 and the scattered light intensity of light from the second light emitting unit 4 exceeds the white smoke threshold value.

Furthermore, the control unit 12 determines the presence of black smoke when the ratio between the scattered light intensity of light from the first light emitting unit 3 and the scattered light intensity of light from the second light emitting unit 4 exceeds the black smoke threshold value. Additionally, the control unit 12 determines the presence of grey smoke when the ratio between the scattered light intensity of light from the first light emitting unit 3 and the scattered light intensity of light from the second light emitting unit 4 does not exceed both the white smoke threshold value and the black smoke threshold value.

In Embodiment 1, the second scattering angle $\theta 2$, which is the angle between the reception axis 50 of the light receiving unit 5 and the second extension 41 extending from the intersection of the second emission axis 40 and the reception axis 50 in the direction away from the second light emitting unit 4, is larger than the first scattering angle $\theta 1$, which is the angle between the reception axis 50 of the light receiving unit 5 and the first extension 31 extending from the intersection of the first emission axis 30 and the reception axis 50 in the direction away from the first light emitting unit 3. This makes it easier for the ratio between the scattered light intensity of light from the first light emitting unit 3 and the scattered light intensity of light from the second light emitting unit 4 to vary depending on the type of smoke. Therefore, the smoke detector 1 has a high capacity for discriminating between smokes. The control unit 12 determines the presence of white smoke when the intensity of scattered light received by the light receiving unit 5 exceeds the white smoke threshold value stored in the storage unit 11, and determines the presence of black smoke when the intensity of scattered light received by the light receiving unit 5 exceeds the black smoke threshold value stored in the storage unit 11. Therefore, the smoke detector 1 can discriminate between white smoke, grey smoke, and black smoke.

Additionally, in the table describing the relationship between the scattered light intensities and the smoke densities corresponding to the scattered light intensities, a received scattered light intensity below the intensity threshold value corresponds to a smoke density lower than a smoke density represented by the proportionality line, which represents that the scattered light intensity is directly proportional to the smoke density, and a scattered light intensity at or above the intensity threshold value corresponds to a smoke density higher than a smoke density represented by the proportionality line. This reduces false detection of smoke at a low scattered light intensity and ensures detection of smoke at a high scattered light intensity.

REFERENCE SIGNS LIST

1: smoke detector, 2: casing, 2a: mount, 2b: smoke detection chamber, 2c: inlet portion, 2d: opening, 3: first light emitting unit, 4: second light emitting unit, 5: light receiving unit, 6: labyrinth, 10: amplification unit, 11: storage unit, 12: control unit, 30: first emission axis, 31: first extension, 40: second emission axis, 41: second extension, 50: reception axis, $\lambda 1$: first wavelength, $\lambda 2$: second wavelength, $\theta 1$: first scattering angle, $\theta 2$: second scattering angle

The invention claimed is:

1. A smoke detector comprising:
   a casing having therein a smoke detection chamber to detect smoke;
   a first light disposed in the casing, the first light being configured to emit light having a first wavelength to the smoke detection chamber, the first light having a first emission axis;
   a second light disposed in the casing, the second light being configured to emit light having a second wavelength to the smoke detection chamber, the second wavelength being longer than the first wavelength of the first light, the second light having a second emission axis; and
   a light receiver disposed in the casing, the light receiver being configured to receive the light emitted from the first light and the light emitted from the second light, the light receiver having a reception axis,
   wherein a second scattering angle that is an angle between the reception axis of the light receiver and a second extension extending from an intersection of the second emission axis and the reception axis in a direction away from the second light is larger than a first scattering angle that is an angle between the reception axis of the light receiver and a first extension extending from an intersection of the first emission axis and the reception axis in a direction away from the first light,
   a controller configured to receive an intensity of scattered light received by the light receiver,
   a storage unit storing: a white smoke threshold value set between a grey-smoke-induced scattered light intensity, serving as a reference, and a white-smoke-induced scattered light intensity; and a black smoke threshold value set between the grey-smoke-induced scattered light intensity and a black-smoke-induced scattered light intensity,
   wherein the controller determines presence of white smoke when the intensity of scattered light received by the light receiver exceeds the white smoke threshold value stored in the storage unit, and determines presence of black smoke when the intensity of scattered light received by the light receiver exceeds the black smoke threshold value stored in the storage unit.

2. The smoke detector of claim 1,
   wherein the controller receives a signal representing a scattered light intensity of light received by the light receiver and converts the received scattered light intensity to a smoke density using a table describing a relationship between scattered light intensities and smoke densities corresponding to the scattered light intensities, and
   wherein in the table, the received scattered light intensity below an intensity threshold value corresponds to a smoke density lower than a smoke density represented by a proportionality line representing that the scattered light intensity is directly proportional to the smoke density, and the received scattered light intensity at or above the intensity threshold value corresponds to a smoke density higher than a smoke density represented by the proportionality line.

3. The smoke detector of claim 1,
   wherein the first wavelength is in a blue region of visible light, and
   wherein the second wavelength is in a red region of the visible light.

* * * * *